Patented Apr. 25, 1933

1,905,404

UNITED STATES PATENT OFFICE

FRANS CORNELIS VAN HEURN, OF AMSTERDAM, NETHERLANDS, ASSIGNOR, BY MESNE ASSIGNMENTS, TO SHELL DEVELOPMENT COMPANY, OF SAN FRANCISCO, CALIFORNIA, A CORPORATION OF DELAWARE

PROCESS OF MANUFACTURING EBONITE IN WHICH STONE CHIPPINGS OR THE LIKE ARE INCORPORATED

No Drawing. Application filed May 21, 1931, Serial No. 539,131, and in Germany May 27, 1930.

In the manufacture of ebonite, in which stone chippings, gravel, basalt slag, etc. are incorporated, it is known to start from rubber latex which is mixed with fillers, sulphur and chippings or the like, evaporating the mixture to dryness, moulding and vulcanizing. If the ebonite blocks thus obtained are used as a basis for rubber paving blocks, the mixtures for the ebonite intermediate layer and the resilient rubber cap are applied on this basis and attached to it by means of vulcanization.

The said method of preparing mixtures of ebonite and chippings presents the drawback that it is very laborious as the rubber latex has to be added by small increments and the water has to be evaporated each time, because the fillers cannot at once absorb the whole quantity of latex to be added. Owing to this and to the partial coagulation of the latex caused by contact with the fillers it is moreover difficult to yield a homogeneous mixture of latext and fillers.

When using raw rubber instead of latex which has the additional advantage that a cheaper material than rubber latex may be used, the drawbacks experienced in using latex have been partly overcome. It has already been proposed to work up the rubber with sulphur and fillers, on mixing rollers, to a homogeneous mass in the way usual in the rubber industry, to roll this mass to sheets, to apply these sheets and layers of chippings alternately in a vulcanization mould, to compress this composite material whilst heating it to about vulcanization temperature and thereupon to vulcanize the rubber.

It has also been proposed to uniformly dress a calendered sheet of rubber containing fillers and sulphur, with chippings, to roll it firmly and to work it up further.

It has further been proposed to mix chippings and rubber sheets between widely spaced rollers or mixers. However, this process is difficult to carry out because the chippings cannot be incorporated into the rubber mixture on the rollers without being crushed, whilst the rollers are in danger of being damaged.

Now according to my present invention a satisfactory incorporation of the chippings with the rubber mixture is effected in a simple way by means of crumbling the said mixture, i. e. the sheet containing the fillers and sulphur obtained from the mixing rollers or calenders, prior to incorporating it with the chippings. The crumbling may be carried out on cold or cooled rollers, with the aid of disintegrators or other grinding devices. When crumbling between rollers these will have to be cooled in order to prevent their getting hot during the operation which would cause the rubber mixture to leave the rollers again in the form of sheets. Moreover, care is to be taken that the rollers are adjusted close to each other and preferably revolve at different speeds. Prior to the crumbling operation the rubber mixture shall be subjected to a partial pre-vulcanization, so that a mixture is obtained which becomes less plastic and can be more easily comminuted.

*Example.*—On the mixing rollers a mixture is prepared of: 15 parts of unvulcanized rubber, 20 parts of talite, 20 parts of chalk, 25 parts of lime, 5 parts of asphalt and 15 parts of sulphur. This mixture is subjected to a pre-vulcanization for 15 minutes at about 150° C. under steam pressure, and thereupon crumbled between cold rollers. Chippings are added to the comminuted mixture in the proportion of about 7 parts of rubber mixture to 11 parts of chippings. This mixture may then be pressed to blocks for instance if it is intended to prepare an underlayer for rubber paving blocks. In this case an ebonite intermediate layer and a resilient rubber cap may preferably be applied on the pressed ebonite chipping blocks, and the whole vulcanized in such a way as to thoroughly unite the various layers to a single block.

I claim:

1. A process of manufacturing ebonite in which stone chippings or the like are incorporated, which comprises preparing a mixture of unvulcanized rubber, fillers and sulphur, subjecting said mixture to a partial vulcanization, crumbling the partially vulcanized mixture and mixing said crumbled, partially vulcanized mixture with a stone aggregate, moulding and then completely vulcanizing the partially vulcanized mixture to produce an ebonite article of manufacture containing aggregate.

2. A process of manufacturing ebonite, in which stone chippings or the like are incorporated, which comprises preparing a mixture of rubber, fillers and sulphur, partially vulcanizing said rubber mixture, crumbling the partially vulcanized rubber mixture on cold rollers, mixing the crumbled, partially vulcanized mass with stone aggregate, moulding and then completing the vulcanization of the partially vulcanized mixture to produce an ebonite article of manufacture containing aggregate.

3. A process of manufacturing rubber paving blocks, which comprises preparing a mixture of unvulcanized rubber, fillers and sulphur, subjecting said mixture to a partial vulcanization, crumbling the partially vulcanized mixture and mixing the crumbled, partially vulcanized mass with a stone aggregate, pressing to blocks, applying to said blocks an ebonite intermediate layer and a resilient rubber top layer, and then completely vulcanizing the partially vulcanized mixture and also vulcanizing the whole so as to thoroughly unite the various layers to a single block.

In testimony whereof I affix my signature.

FRANS CORNELIS van HEURN.